Sept. 9, 1930.  C. L. KEY  1,775,243
WEEDER UNIT
Filed March 3, 1927
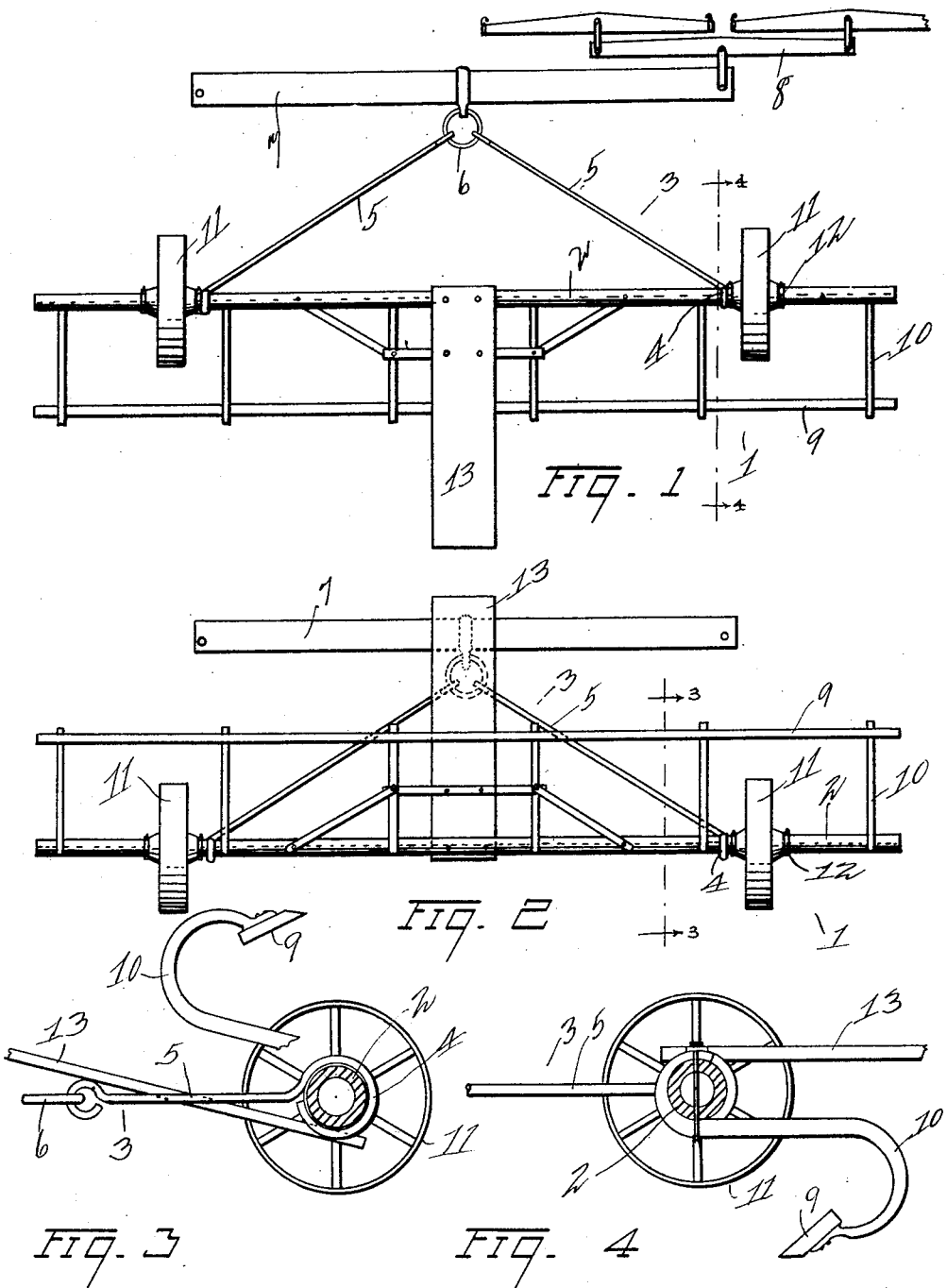

Patented Sept. 9, 1930

1,775,243

UNITED STATES PATENT OFFICE

CLAUDE L. KEY, OF MILTON, OREGON, ASSIGNOR TO KEY WEEDER COMPANY, OF MILTON, OREGON, A CORPORATION OF OREGON

WEEDER UNIT

Application filed March 3, 1927. Serial No. 172,314.

This invention relates to weeder units, of the general type disclosed in my United States patents on weeders, No. 1,607,129 dated November 16, 1926, and No. 1,665,464 dated April 10, 1928, and has as one of its objects to provide an implement whose frame consists of a single beam, the beam being adapted for use as a draw bar.

Another object of the invention is to provide an implement having a single beam rockably mounted in supports, on a fixed center.

A further object of the invention is to provide an implement having a single beam frame rockably mounted on a fixed center whereby the blade of the implement may be easily rocked for dumping as there is no lost motion during the operation and the greatest weight being supported by the beam.

A further object of the invention is to provide an implement having a relatively long cutting blade with a relatively narrow wheel track.

A further object of the invention is to provide an implement whose depth of cut may be regulated without affecting the position of the supports with respect to the soil.

With these and other objects in view, reference is now had to the accompanying drawings in which Fig. 1 is a plan view of the unit in its operative position;

Fig. 2 is a plan view of the unit in its inoperative position;

Fig. 3 is a sectional end elevation on the line 3—3 of Fig. 2; and

Fig. 4 is a sectional end elevation on the line 4—4 of Fig. 1.

Having reference to the drawings like numerals refer to like parts throughout the several views and the numeral 1 refers to the unit which consists of a single beam 2, of circular, or preferably of cylindrical cross section, as shown in Figs. 3 and 4, the cylindrical form being preferable as affording lightness with strength.

The curviform also permits its use as an axle, in a manner and for a purpose to be explained, and its strength and form also provides for its use as a draft bar, a draft means 3 being hingedly attached to the beam as at 4, to permit a free rocking movement of that member during the dumping operation.

The draft means consists of a pair of irons 5 joined by a ring 6 and positioned to form a V, the open part of the V being attached to the beam at points approximating the centers of percussion of each half of said beam while the ring at the closed end receives an evener 7 to which will be attached the double trees 8.

The beam also carries a cutting blade 9 which is rigidly attached thereto by means of goosenecks 10 and the goosenecks are positioned in the usual manner, i. e., one at each end of the beam with others interspersed between them.

Finally the unit is supported by wheels 11, these being mounted on and using the beam as an axle.

The wheels are secured on the beam in any suitable manner or by the set collars 12 as shown and they are positioned thereon within the goosenecks, the ends of the beam extending through the wheels to carry the strain of the outer goosenecks, thus more equally distributing the load on the beam.

For the same purpose the irons of the draft means are directly and hingedly attached to the beam adjacent to the wheels, to more evenly distribute the strain of the draft.

By this arrangement also the beam is brought close to the ground, affording short goosenecks and permitting the blade to be brought close under the beam to shorten the leverage and thus provide ease in dumping and for economical reasons.

A dumping board 13 is rigidly attached to the beam and extends rearwardly therefrom, and in dumping for cleaning purposes, or when moving from one place of operation to another, the blade is lifted out of the ground by means of this board. In moving, the board will be rotated until it will rest on the irons of the draft means and the blade will then be positioned out of the ground as shown in Figs. 2 and 3.

In operation the blade is manually held in the ground by the dumping board. The strain of the draft means is now distributed to two places on the beam while the reaction occurring from the blade is distributed throughout the length of the beam thus providing for a relatively light frame, and hence a light and inexpensive weeder unit, with its consequent light draft.

Having thus described my invention, I claim:

In a weeder unit, a frame comprising a single rockable beam, said beam being extended and adapted to form a combined axle and draft bar, a draft means attached to the draft bar so formed and comprising a V shaped structure consisting of a pair of irons joined centrally by a ring, and terminating in hinge members on the ends of said irons, opposite said ring, said hinge members being adapted to encircle said beam and permit a free rocking movement of said beam in the hinge members, and disposed within the extensions of said beam to provide an equalized draft thereon, a blade rockable with and rigidly attached to and throughout the length of said beam and its extensions, by goosenecks disposed to distribute the load of the blade and its draft equally thereon, said goosenecks being spaced in a manner to avoid said hinge members, wheels mounted on and supporting said beam, within said extensions and at the point of hinge connections therewith, and a dumping board rigidly attached to said beam and adapted to rest on said draft means when the beam is rocked to clean the blade.

In testimony whereof I have affixed my signature.

CLAUDE L. KEY.